(12) United States Patent
Ganzel

(10) Patent No.: US 12,084,034 B2
(45) Date of Patent: *Sep. 10, 2024

(54) APPARATUS AND METHOD FOR CONTROL OF A HYDRAULIC BRAKE SYSTEM

(71) Applicant: ZF Active Safety US Inc., Livonia, MI (US)

(72) Inventor: Blaise Joseph Ganzel, Ann Arbor, MI (US)

(73) Assignee: ZF Active Safety US Inc., Livonia, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/321,858

(22) Filed: May 23, 2023

(65) Prior Publication Data

US 2023/0294649 A1  Sep. 21, 2023

Related U.S. Application Data

(63) Continuation of application No. 17/188,363, filed on Mar. 1, 2021, now Pat. No. 11,919,500.

(51) Int. Cl.
*B60T 13/74* (2006.01)
*B60T 7/06* (2006.01)
(Continued)

(52) U.S. Cl.
CPC ............. *B60T 8/4086* (2013.01); *B60T 7/06* (2013.01); *B60T 13/142* (2013.01); *B60T 13/745* (2013.01); *B60T 2220/04* (2013.01)

(58) Field of Classification Search
CPC .. B60T 13/745; B60T 8/4086; B60T 2220/04; B60T 7/06; B60T 13/142; B60T 13/575
See application file for complete search history.

(56) References Cited

U.S. PATENT DOCUMENTS 3,149,539 A * 9/1964 Prather ................. B60T 13/244
                                                    91/369.2
5,120,115 A   6/1992 Schmitt et al.
(Continued)

FOREIGN PATENT DOCUMENTS

DE       102016203119 A1    8/2017
DE       102017219598 A1    7/2018
WO         2019/195542 A1  10/2019

OTHER PUBLICATIONS

German Search Report for corresponding German Application Serial No. 10 2022 201 773.0, dated Sep. 23, 2022, pp. 1-12.

*Primary Examiner* — Bradley T King
(74) *Attorney, Agent, or Firm* — Kristin L. Murphy

(57) ABSTRACT

A brake system for selectively actuating at least one of a pair of front wheel brakes and a pair of rear wheel brakes includes a reservoir and a master cylinder. A power transmission unit is configured for selectively providing pressurized hydraulic fluid. A pair of rear brake motors selectively electrically actuate rear parking brakes. An electronic control unit controls at least one of the power transmission unit and the pair of rear brake motors. A normally-closed DAP valve is located hydraulically between the power transmission unit and at least one of a two-position three-way valve and at least the selected one of the pairs of wheel brakes. An isolation valve and a dump valve are associated with each wheel brake.

14 Claims, 13 Drawing Sheets

(51) Int. Cl.
*B60T 8/40* (2006.01)
*B60T 13/14* (2006.01)

(56) References Cited

U.S. PATENT DOCUMENTS

| | | | |
|---|---|---|---|
| 5,531,509 | A | 7/1996 | Kellner et al. |
| 6,739,676 | B1 * | 5/2004 | Isono .................... B60T 13/575 |
| | | | 303/115.3 |
| 10,730,501 | B2 | 8/2020 | Ganzel |
| 2013/0213025 | A1 | 8/2013 | Linden |
| 2014/0131154 | A1 | 5/2014 | Ganzel |
| 2014/0265547 | A1 | 9/2014 | Ganzel |
| 2015/0091371 | A1 * | 4/2015 | Hyodo .................. B60T 13/662 |
| | | | 303/113.4 |
| 2016/0009263 | A1 | 1/2016 | Feigel et al. |
| 2016/0016571 | A1 | 1/2016 | Ganzel |
| 2016/0121864 | A1 * | 5/2016 | Misunou ................. B60T 11/26 |
| | | | 60/591 |
| 2016/0264113 | A1 | 9/2016 | Feigel |
| 2018/0215366 | A1 | 8/2018 | Leiber et al. |
| 2019/0092304 | A1 | 3/2019 | Ganzel |
| 2019/0225205 | A1 | 7/2019 | Ganzel |
| 2020/0207320 | A1 | 7/2020 | Plewnia |
| 2020/0290586 | A1 | 9/2020 | Biller |
| 2020/0307538 | A1 | 10/2020 | Ganzel |
| 2020/0406880 | A1 | 12/2020 | Zimmermann et al. |
| 2021/0155215 | A1 | 5/2021 | Ganzel |
| 2021/0261109 | A1 | 8/2021 | Ganzel |
| 2022/0274571 | A1 | 9/2022 | Ganzel |

\* cited by examiner

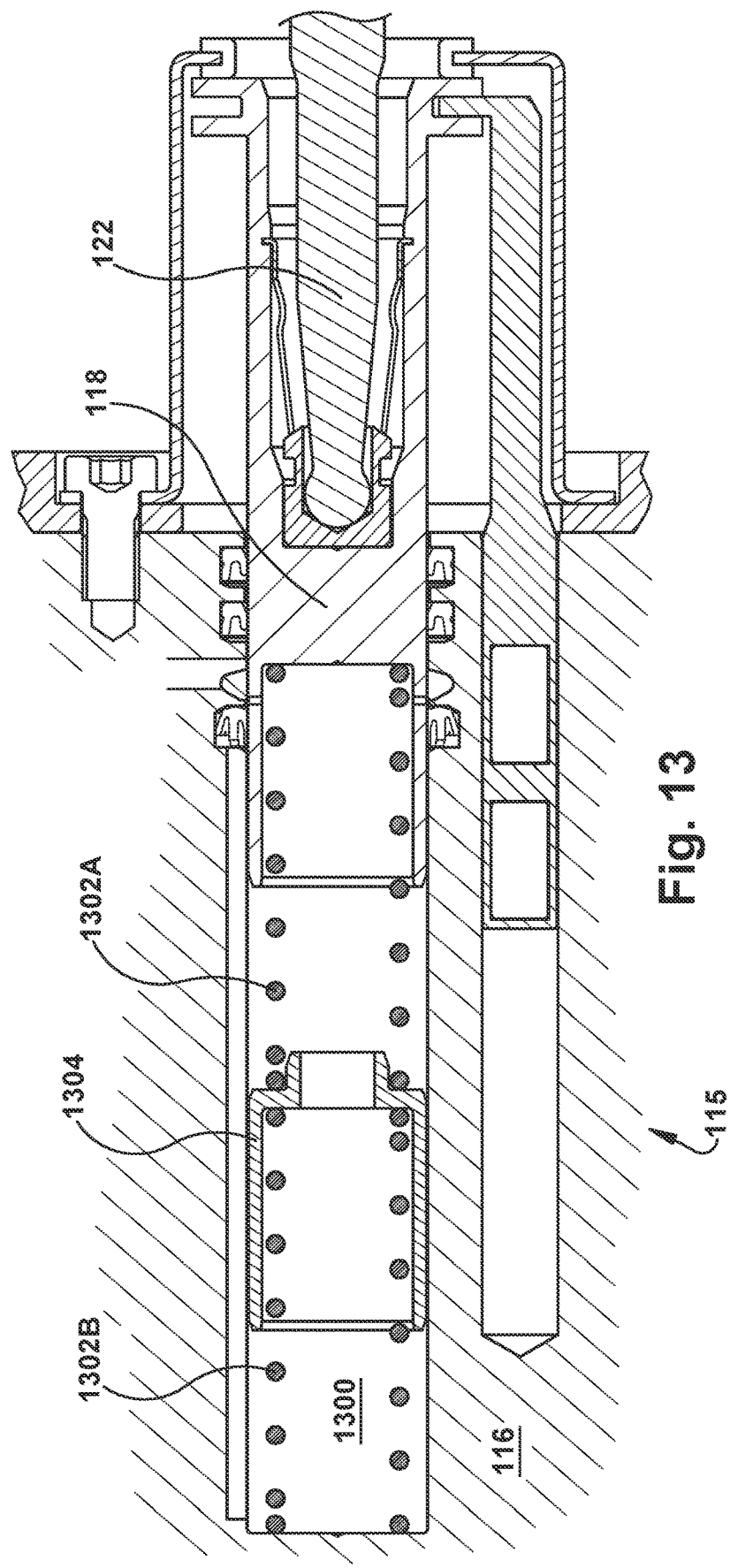

APPARATUS AND METHOD FOR CONTROL OF A HYDRAULIC BRAKE SYSTEM

RELATED APPLICATIONS

This application claims the benefit of U.S. application Ser. No. 17/188,363, filed Mar. 1, 2021, the entirety of which is incorporated by reference herein.

TECHNICAL FIELD

This disclosure relates to an apparatus and method for control of a hydraulic brake system and, more particularly, to a method and apparatus of providing independent pressure control of each.

BACKGROUND

A brake system may include anti-lock control including a pedal-operated hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include both anti-lock control and traction slip control, which can use braking pressure modulators for controlled vehicular braking.

Descriptions of prior art brake systems are in U.S. Pat. No. 10,730,501, issued 4 Aug. 2020 to Blaise Ganzel and titled "Vehicle Brake System with Auxiliary Pressure Source", and in U.S. Patent Application Publication No. 2020/0307538, published 1 Oct. 2020 by Blaise Ganzel and titled "Brake System with Multiple Pressure Sources", both of which are incorporated herein by reference in their entirety for all purposes.

SUMMARY

In an aspect, a brake system for selectively actuating at least one of a pair of front wheel brakes and a pair of rear wheel brakes is described. The brake system includes a reservoir and a master cylinder operable during a manual push-through mode by actuation of a brake pedal connected to the master cylinder to generate brake actuating pressure at a first output for hydraulically actuating at least one of a pair of front wheel brakes and a pair of rear wheel brakes during the manual push-through mode. A power transmission unit is configured for selectively providing pressurized hydraulic fluid for actuating at least a selected one of the pair of front wheel brakes and the pair of rear wheel brakes in a boosted brake mode during a braking event. A pair of rear brake motors selectively electrically actuate respective left and right rear wheel parking brakes. An electronic control unit controls at least one of the power transmission unit and the pair of rear brake motors. A pedal simulator is in fluid communication with the master cylinder for providing predetermined brake pedal response. A two-position three-way valve is hydraulically connected with the master cylinder and the power transmission unit and with at least the selected one of the pairs of wheel brakes. The three-way valve selectively controls hydraulic fluid flow from a chosen one of the master cylinder and the power transmission unit to at least the selected one of the pairs of wheel brakes. A normally-closed DAP valve is located hydraulically between the power transmission unit and at least one of the three-way valve and at least the selected one of the pairs of wheel brakes. An isolation valve and a dump valve are associated with each wheel brake of the pair of front wheel brakes and the pair of rear wheel brakes. The isolation valve is located hydraulically between a respective wheel brake and the three-way valve, and the dump valve is located hydraulically between a respective wheel brake and the reservoir, for at least the selected one of the pairs of wheel brakes.

BRIEF DESCRIPTION OF THE DRAWINGS

For a better understanding, reference may be made to the accompanying drawings, in which:

FIG. 13 is a schematic partial side view of a fourth component suitable for use in a brake system according to any aspect of the present invention.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
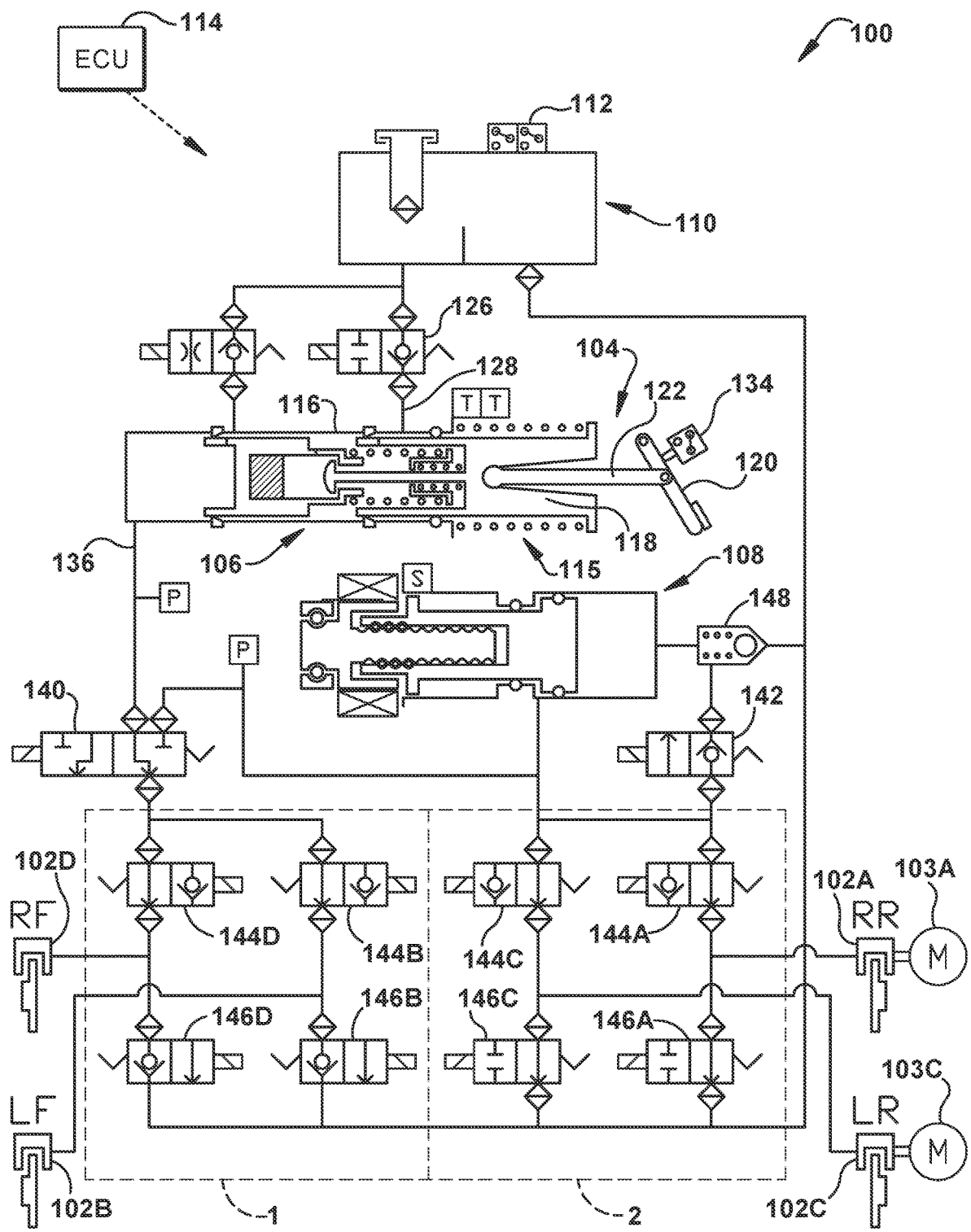
FIG. 1 is a schematic hydraulic diagram of a brake system according to an aspect of the present invention, in a first configuration.

FIG. 1 depicts a brake system 100 for actuating a pair of front wheel brakes and a pair of rear wheel brakes, in a first configuration. The brake system 100 is shown here as a hydraulic boost braking system in which boosted fluid pressure is utilized to apply braking forces for the brake system 100. The brake system 100 may suitably be used on a ground vehicle, such as an automotive vehicle having four wheels with a wheel brake associated with each wheel. Furthermore, the brake system 100 can be provided with other braking functions such as anti-lock braking (ABS) and other slip control features to effectively brake the vehicle. Components of the brake system 100 may be housed in one or more blocks or housings. The block or housing may be made from solid material, such as aluminum, that has been drilled, machined, or otherwise formed to house the various components. Fluid conduits may also be formed in the block or housing.

In the illustrated embodiment of the brake system 100, there are four wheel brakes 102A, 102B, 102C, and 102D. The wheel brakes 102A, 102B, 102C, and 102D can have any suitable wheel brake structure operated electrically and/or by the application of pressurized brake fluid. Each of the wheel brakes 102A, 102B, 102C, and 102D may include, for example, a brake caliper mounted on the vehicle to engage a frictional element (such as a brake disc) that rotates with a vehicle wheel to effect braking of the associated vehicle wheel. The wheel brakes 102A, 102B, 102C, and 102D can be associated with any combination of front and rear wheels of the vehicle in which the brake system 100 is installed. For example, the brake system 100 may be configured as a front/rear split system, as shown, such that a first pressure circuit (indicated by dashed line "1" in FIG. 1) is associated with providing fluid to the front wheel brakes 102B and 102D. A second pressure circuit (indicated by dashed line "2" in FIG. 1) may be associated with providing fluid to the rear wheel brakes 102A and 102C, when the rear wheel brakes 102A and 102C are hydraulically operated, and/or the rear wheel brakes 102A and 102C may be electrically operated, such as by including the pair of rear wheel motors 103A and 103C for selectively electrically actuating respective left and right rear wheel parking brakes on the rear wheels, as shown in FIG. 1.

In this example, the wheel brake 102A may be associated with a right rear wheel of the vehicle in which the brake system 100 is installed, and the wheel brake 102B may be associated with the left front wheel. The wheel brake 102C may be associated with the left rear wheel, and the wheel brake 102D may be associated with the right front wheel. Alternatively, though not depicted here, the brake system 100 may be configured as a diagonal split brake system such that the wheel brakes 102A and 102B are associated with wheels at the front or rear axle of the vehicle, and the wheel brakes 102C and 102D are associated with wheels at the other axle of the vehicle.

The brake system 100 generally includes a brake pedal unit, indicated generally at 104, a pedal simulator, indicated generally at 106, a power transmission unit (also known as a single acting plunger or a plunger assembly in some configurations), indicated generally at 108, and a fluid reservoir 110. The reservoir 110 stores and holds hydraulic fluid for the brake system 100. The fluid within the reservoir 110 is preferably held at or about atmospheric pressure, but the fluid may be stored at other pressures if desired. The reservoir 110 is shown schematically having two tanks or sections with fluid conduit lines connected thereto. The sections can be separated by several interior walls within the reservoir 110 and are provided to prevent complete drainage of the reservoir 110 in case one of the sections is depleted due to a leakage via one of the two lines connected to the reservoir 110. Alternatively, the reservoir 110 may include multiple separate housings. The reservoir 110 may include at least one fluid level sensor 112 for detecting the fluid level of one or more of the sections of the reservoir 110.

The power transmission unit 108 of the brake system 100 functions as a source of pressure to provide a desired pressure level to the hydraulically operated ones of the wheel brakes 102A, 102B, 102C, and 102D during a typical or normal non-failure brake apply. After a brake apply, fluid from the hydraulically operated ones of the wheel brakes 102A, 102B, 102C, and 102D may be returned to the power transmission unit 108 and/or diverted to the reservoir 110. In the depicted embodiment, the power transmission unit 108 is a dual acting plunger assembly which is configured to also provide boosted pressure to the brake system 100 when a piston of the power transmission unit 108 is stroked rearwardly as well as forwardly. It is also contemplated that a configurations (not shown) of the brake system 100 could include hydraulic control of all four wheels, or of the rear wheels instead of the front wheels (which would then be electrically controlled/actuated). One of ordinary skill in the art would be readily able to provide such an arrangement for a desired use environment, following aspects of the present invention.

Regardless of specific configuration, though, the power transmission unit 108 is configured for selectively providing pressurized hydraulic fluid for actuating at least a selected one of the pair of front wheel brakes 102B, 102D and the pair of rear wheel brakes 102A, 102C in a boosted braking mode during a braking event;

The brake system 100 also includes at least one electronic control unit ("ECU") 114. The ECU 114 may include microprocessors and other electrical circuitry. The ECU 114 receives various signals, processes signals, and controls the operation of various electrical components of the brake system 100 in response to the received signals. The ECU 114 can be connected to various sensors such as the reservoir fluid level sensor 112, pressure sensors, travel sensors, switches, wheel speed sensors, and steering angle sensors. The ECU 114 may also be connected to an external module (not shown) for receiving information related to yaw rate, lateral acceleration, longitudinal acceleration of the vehicle, or other characteristics of vehicle operation for any reason, such as, but not limited to, controlling the brake system 100 during vehicle braking, stability operation, or other modes of operation. Additionally, the ECU 114 may be connected to the instrument cluster for collecting and supplying information related to warning indicators such as an ABS warning light, a brake fluid level warning light, and a traction control/vehicle stability control indicator light. The electronic control unit 114 is provided, in the configuration of the brake system 100 shown in FIG. 1, for controlling at least one of the power transmission unit 108 and the pair of rear brake motors 103.

As shown schematically in FIG. 1, the brake pedal unit 104 includes a master cylinder 115 with a housing 116 for slidably receiving various cylindrical pistons and other components therein. Note that the housing is not specifically schematically shown in the Figures, but instead the walls of the longitudinally extending bore are schematically illustrated. The housing 116 may be formed as a single unit or include two or more separately formed portions coupled together. An input piston 118 is connected with a brake pedal 120 via a linkage arm 122. Leftward movement of the input piston 118 may cause, under certain conditions, a pressure increase within the master cylinder 115.

In the brake system 100 of FIG. 1, the pedal simulator 106 is integrated into the master cylinder 115 by being at least partially enclosed within the housing 116 of the master cylinder 115 to create an integrated pedal simulator 106. This arrangement is shown schematically in FIG. 2.

Figure 2:
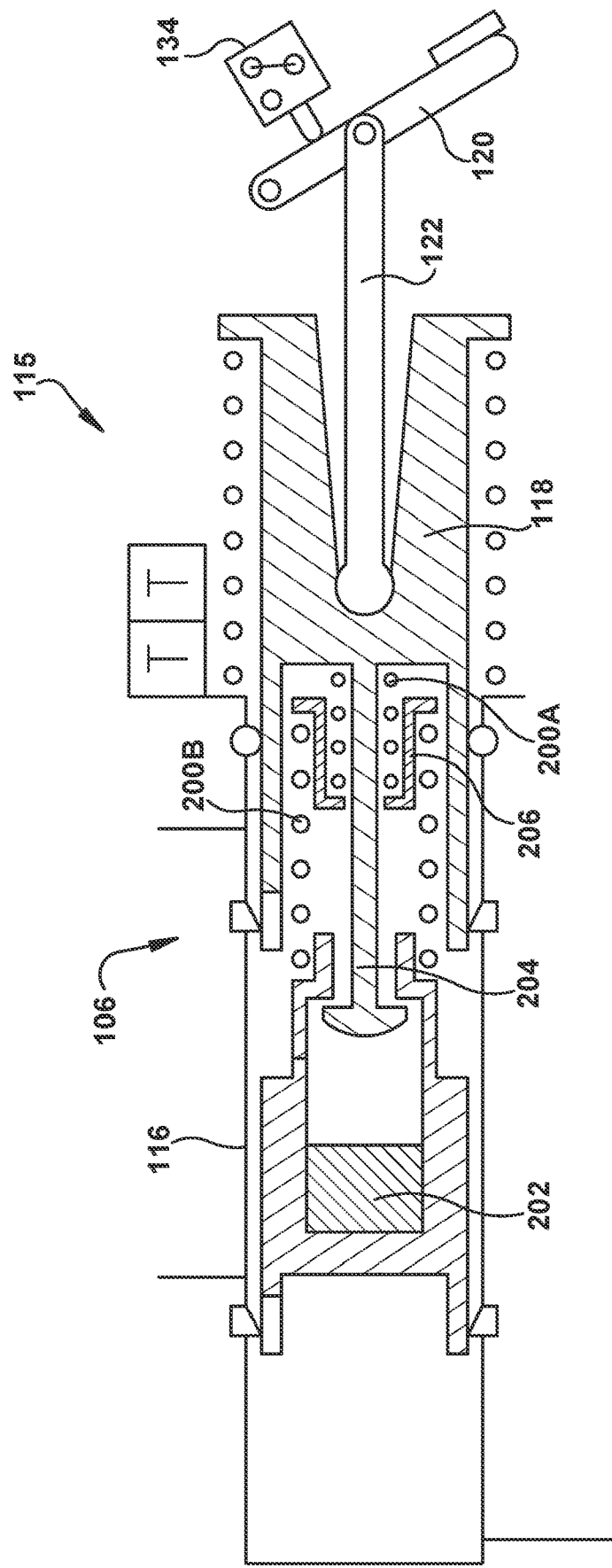
FIG. 2 is a schematic partial side view of a second component suitable for use in a brake system according to any aspect of the present invention.

The integrated pedal simulator 106 is shown in FIG. 2 as being configured to provide a progressive force-versus-travel curve for the brake pedal 120 using a plurality of force-response springs, having any desired similar or different spring forces, with two different force-response springs 400A and 400B being shown and described herein with respect to the pedal simulator 106. As shown in FIG. 2, the integrated pedal simulator includes a resilient stop 202 against which a rounded-end shaft 204 presses to cushion impact of the shaft 204 during operation of the pedal simulator 106 portion of the master cylinder 115. The shaft 204 is directly connected to the linkage arm 122 via the input piston 118. A spring retainer 206 maintains position of the lower-resistance force-response spring 200A, as shown.

In use, the driver pushes the brake pedal 120, which forces the linkage arm 122 toward the left, in the orientation of FIG. 2. The lower-resistance force-response spring 200A resists the pushing force until it is compressed to the point that the input piston 118 contacts the rightmost (in the orientation of FIG. 2, surface of the spring retainer 206). Once such contact is made, the spring retainer 206 moves in concert with the linkage arm 118 to further compress the higher-resistance force-response spring 200B within the housing 116 under maintained compressive force. In this manner, the integrated pedal simulator 106 provides a comfortable and expected "feel" to the brake pedal 120 for the driver. Should compressive force be maintained by the driver until the curved head of the shaft 204 comes into contact with the resilient stop 202, that curved or spherical surface helps to spread the compressive force against the resilient stop 202, as well as avoid a jarring, sudden contact with the resilient stop 202 that a driver would likely find unpleasant and to mimic the feeling of vacuum booster runout.

With reference once again to FIG. 1, the brake system 100 may further include an optional solenoid actuated simulator test valve 126 which may be electronically controlled between a de-energized position (wherein a slight pressure, around 0.3 bar, is needed to open the valve) and a powered closed position, and which is located fluidly between the reservoir 110 and the master cylinder 115. The simulator test valve 126 may not be needed during a normal brake apply or for a manual push-through mode. The simulator test valve 126 may include a test valve spring biasing the simulator test valve 126 toward a closed condition. One example simulator test valve 126 is shown and described in co-pending patent application U.S. patent application Ser. No. 17/188,227, filed concurrently herewith and titled "Hydraulic Brake Boost", which is incorporated herein by reference in its entirety, for all purposes.

The simulator test valve 126 can be actuated to resist opening under predetermined pressure(s) during various testing modes to determine the correct operation of other components of the brake system 100. For example, the simulator test valve 126 may be actuated to a closed position to prevent venting to the reservoir 110 via a reservoir conduit 128 to monitor fluid flow to determine whether leaks may be occurring through seals of various components of the brake system 100.

The brake pedal unit 104 is connected to the brake pedal 120 and is actuated by the driver of the vehicle as the driver presses on the brake pedal 120. A brake sensor or switch 134 may be electrically connected to the ECU 114 to provide a signal indicating a depression of the brake pedal 120. The brake pedal unit 104 may be used as a back-up source of pressurized fluid to essentially replace the normally supplied source of pressurized fluid from the power transmission unit 108 under certain failed conditions of the brake system 100, and/or upon initial startup of the brake system 100. This situation is referred to as a manual push-through event, or a "manual apply". In the brake systems 100 shown and described herein, manual push-through may be accomplished for one pair of wheel brakes 102 only (usually for the pair of front wheel brakes 1028, 102D for vehicle weight distribution and weight transfer during braking reasons), or for all four wheel brakes 102 (i.e., the pair of front wheel brakes 1028, 102D and the pair of rear wheel brakes 102A, 102C).

The brake pedal unit 104 can supply pressurized fluid to a master cylinder output 136, which is then routed to the hydraulically operated ones of the wheel brakes 102A, 1028, 102C, and 102D as desired. This flow is pushed through, largely under mechanical pressure upon the brake pedal 120 from the driver's foot, from the master cylinder 115. That is, the master cylinder 115 is operable during a manual push-through mode by actuation of the brake pedal 120 connected to the master cylinder 115 to generate brake actuating pressure at a first output (here, schematically shown as master cylinder output 136) for hydraulically actuating—in that manual push-through mode—the hydraulically-actuated ones of the brakes (shown and described in FIG. 1 as the pair of front wheel brakes 102B and 102D).

As shown in the Figures, a pair of rear brake motors 103 may be provided for selectively electrically actuating parking brakes associated with respective rear wheels. It is contemplated that the wheel brakes 102A, 1028, 102C, and 102D could each be powered electrically and/or hydraulically—for example, the front wheel brakes 1028 and 102D could be electrically powered and the rear wheel brakes 102A and 102C could be hydraulically powered, and/or at least one of the wheel brakes 102A, 1028, 102C, and 102D could be powered electrically during certain phases of operation and hydraulically during other phases of operation, of the same brake system 100, in addition to the potential provision of electrically or hydraulically operated parking brakes to any of the front and/or rear wheels, as desired.

A power transmission unit 108 is configured for selectively providing pressurized hydraulic fluid for actuating the pair of front wheel brakes 1028 and 102D and the pair of rear wheel brakes 102A and 102C during a braking event. The electronic control unit 114 controls at least one of the power transmission unit 108 and the pair of rear brake motors 138.

Figure 4:
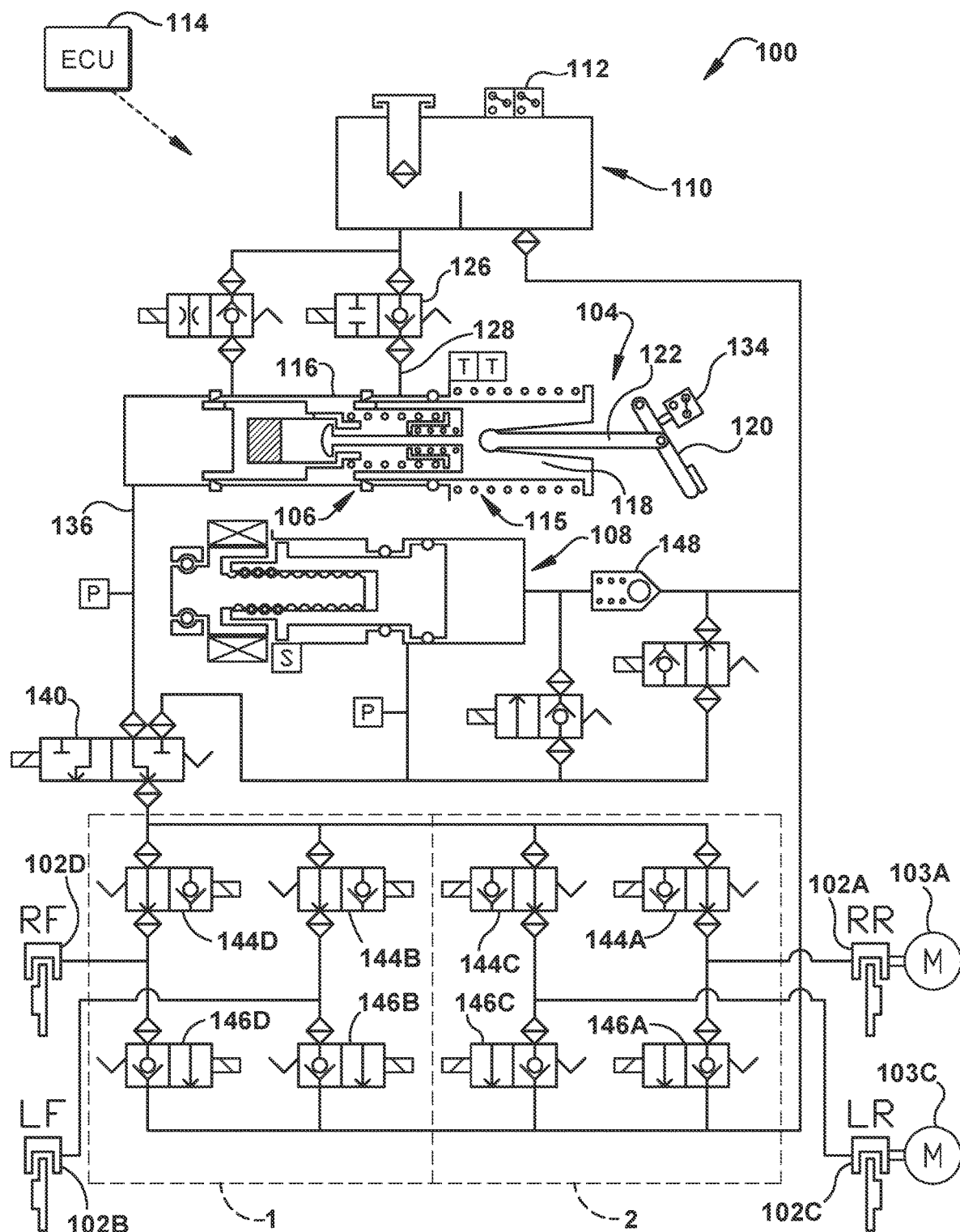
FIG. 4 is a schematic hydraulic diagram of the brake system of FIG. 1, in a third configuration.

A two-position three-way valve 140 is hydraulically connected with the master cylinder 115 and the power transmission unit 108 and, as shown in FIG. 1, with the front wheel brakes 1028 and 102D. The three-way valve 140 selectively controls hydraulic fluid flow from a chosen one of the master cylinder 115 and the power transmission unit 108 to at least a selected one of the pair of front wheel brakes 1028 and 102D and the pair of rear wheel brakes 102A and 102C. (For example, FIG. 1 depicts a "two-wheel push-through" or "front wheel push-through" and thus the three-way valve 140 is only fluidically connected for actuation of the front wheel brakes 1028 and 102D, in FIG. 1. FIG. 4, in contrast, shows the three-way valve 140 being fluidically connected for actuation of both the pair of front wheel brakes 102B and 102D and the pair of real wheel brakes 102A and 102C, for "four-wheel push-through".)

Through use of the three-way valve 140, hydraulic fluid can be routed to the selected pair of front wheel brakes 102B/102D (and/or rear wheel brakes 102A/102C, in some configurations) in a desired manner (from a chosen one of the master cylinder 115 or the power transmission unit 108) to assist with boosted braking control and provide desired response times and efficient pressure flow to the front wheel brakes 102B and 102D. Stated differently, the three-way valve 140 is configured to selectively switch the brake system 100 between manual push-through mode and boosted braking mode. A single three-way valve 140 is used here instead of one normally-closed valve and one normally-open valve for cost and packaging reasons, but also to reduce current draw. This is mainly due to the fact that the normally-open valve would need a high force spring to avoid it becoming hydraulically locked closed if power is lost during a boosted brake apply which could trap brake pressure and/or cause unwanted braking when the pedal is released.

A normally-closed dual-acting plunger ("DAP") valve 142 is located hydraulically between the power transmission unit 108 and at least one of the three-way valve 140 and at least the selected one of the pairs of wheel brakes (i.e., the pair of front wheel brakes 102B, 102D and/or the pair of rear wheel brakes 102A, 102C).

An isolation valve 144 and a dump valve 146 are associated with each wheel brake of the pair of front wheel brakes 102B, 102D and the pair of rear wheel brakes 102A, 102C. One or more dump valve(s) 146 may be normally-open, such as those used with the rear wheel brakes 102A, 102C in certain configurations of the brake system 100. (The isolation valves 144 and dump valves 146 are labeled in the Figures with a suffixed "A", "B", "C", or "D" to indicate the corresponding one of the wheel brakes 102 with which each is associated). The isolation valves 144 are located hydraulically between their respective wheel brake 102 and the three-way valve 140, and the dump valves 146 are located hydraulically between their respective wheel brake 102 and the reservoir 110, for the pair(s) of wheel brakes (i.e., the pair of front wheel brakes 102B, 102D and/or the pair of rear wheel brakes 102A, 102C) which are being controlled for selective manual push-through by the three-way valve 140.

The isolation valves 144B, 144D for the pair of front wheel brakes 102B, 102D may connect to the power transmission unit 108 through the three-way valve 140 while the pair of rear wheel brakes 102A, 102C bypasses the three-way valve 140 to connect to the power transmission unit 108. This is the situation shown, for example, in FIG. 1, which only facilitates two-wheel push-through operation.

In contrast, and as shown in, for example, FIG. 4, the isolation valves 144A, 144B, 144C, and 144D for the pair of front wheel brakes 102B, 102D and for the pair of rear wheel brakes 102A, 102C connect to the power transmission unit 108 through the three-way valve 140, for four-wheel push-through operation, as will be discussed below.

FIG. 1 also depicts a replenishing check valve 148, which is located fluidically between the reservoir 110 and the power transmission unit 108. When present, the replenishing check valve 148 may be provided to assist with refilling of the power transmission unit 108 (or components thereof) under predetermined conditions. For example, the replenishing check valve 148 may help to facilitate refilling of the chamber in front of the DAP head when the DAP is building pressure during its retraction stroke (normally closed DAP valve de-energized) by pushing fluid out of the annular chamber behind the DAP head. This is done, for example, during slip control if additional flow to the brakes is needed after the DAP is stroked fully forward.

Figure 3:
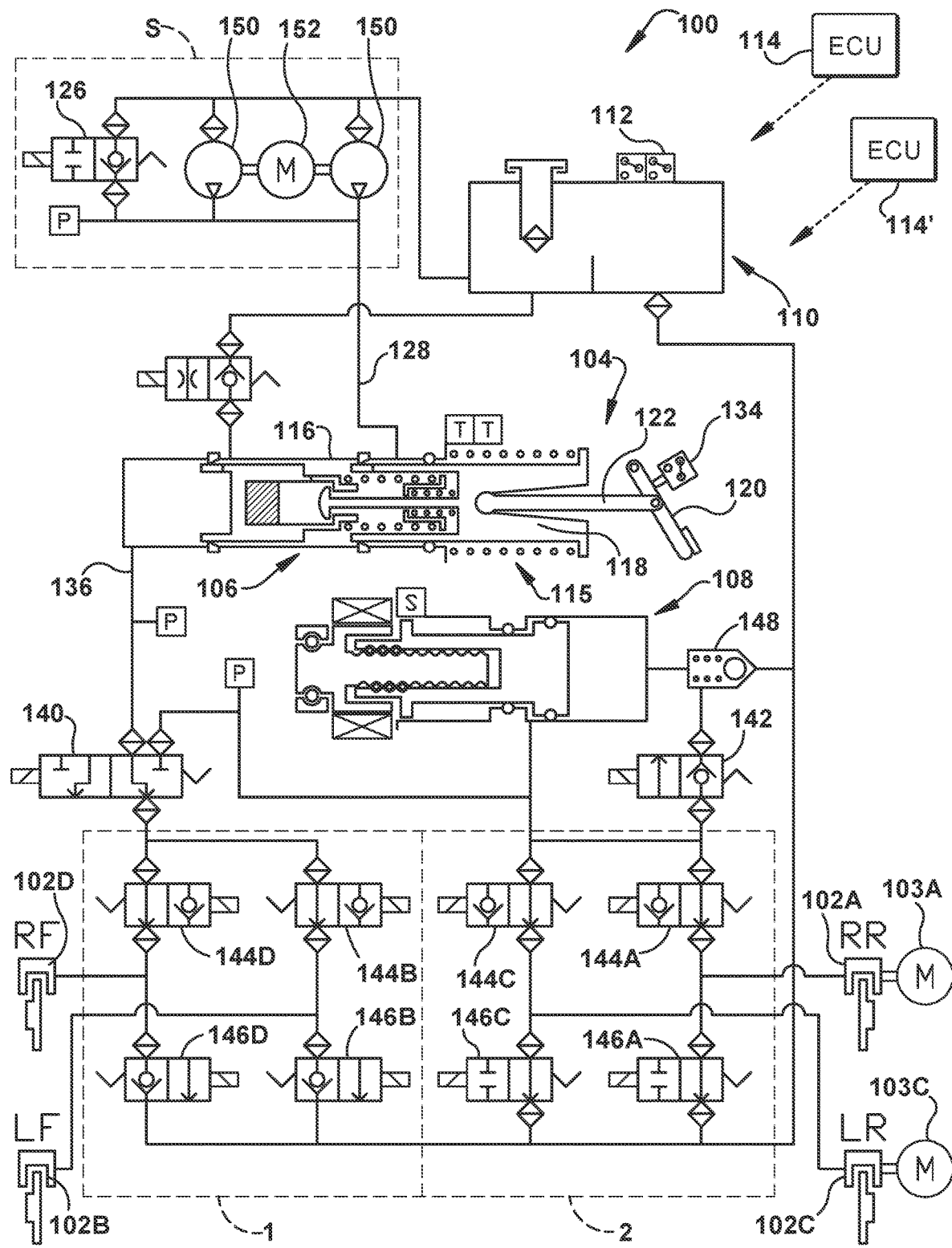
FIG. 3 is a schematic hydraulic diagram of the brake system of FIG. 1, in a second configuration.

With reference now to FIG. 3, a second configuration of the brake system 100 is depicted, parts or all of which can be used with other components of the present invention, as desired. Description of similar components and operation which is made elsewhere in this application will not necessarily be repeated for each and every described configuration or aspect of the brake system 100, for brevity, but should instead be considered to apply to like-numbered portions of other configurations as appropriate.

In the arrangement of the brake system 100 shown in FIG. 3, the electronic control module 114 is a first electronic control module 114. The brake system 100 shown in FIG. 3 also includes a second electronic control module 114', which may be the same as, or different than, the first electronic control module 114. This arrangement may be useful, for example, for providing redundancy in the brake system, and/or for facilitating autonomous braking. It is contemplated, for example, that the master cylinder 115, brake pedal 120 and related structures, and the pedal simulator 106 and related structures, could be omitted from the brake system 100 otherwise shown in FIG. 3, for a truly autonomous brake arrangement. Another autonomous braking scheme is shown and described in, for example, in co-pending patent application U.S. patent application Ser. No. 17/188,288, filed concurrently herewith and titled "Apparatus and Method for Control of a Hydraulic Brake System", which is hereby incorporated by reference for all purposes.

In the arrangement shown in FIG. 3, a pair of pumps 150 are controlled by the second electronic control module 114' and powered by pump motor 152 to serve as a source of pressurized fluid also or instead of at least one of the master cylinder 115 and the power transmission unit 108 previously discussed. A chosen one of the first and second electronic control modules 114 and 114' may control the power transmission unit 108, the pair of front wheel brakes 102B and 102D, and the pair of rear wheel brakes 102A and 102C, and the other one of the first and second electronic control modules 114 and 114' may control the rear wheel motors 103A and 103C for the parking brakes associated with the rear wheels. As symbolized by the dashed line "S", the pumps 150, pump motor 152, and simulator test valve 126 may be controlled by the second electronic control unit 114' in the configuration depicted in FIG. 3.

Optionally, the simulator test valve 126, and/or any other desired sensors, valves, or other components of the brake system 100 which are shown in FIG. 3 as being controlled by the first electronic control unit 114, could be controlled by the second electronic control module 114', along with the pumps 150, pump motor 152, and rear wheel motors 103A and 103C. As shown, the other components of the brake system 100 in FIG. 2 are substantially similar to those shown in FIG. 1 and discussion of these is not repeated herein.

Turning now to FIG. 4, the brake system 100 is depicted in a third configuration. In FIG. 4, as previously mentioned, all four of the wheel brakes 102 are connected to the three-way valve 144 for selective switching between the power transmission unit 108 and manual push-through from the master cylinder 115. The master cylinder 115 shown in FIG. 4 includes an integrated pedal simulator 106.

Figure 5:
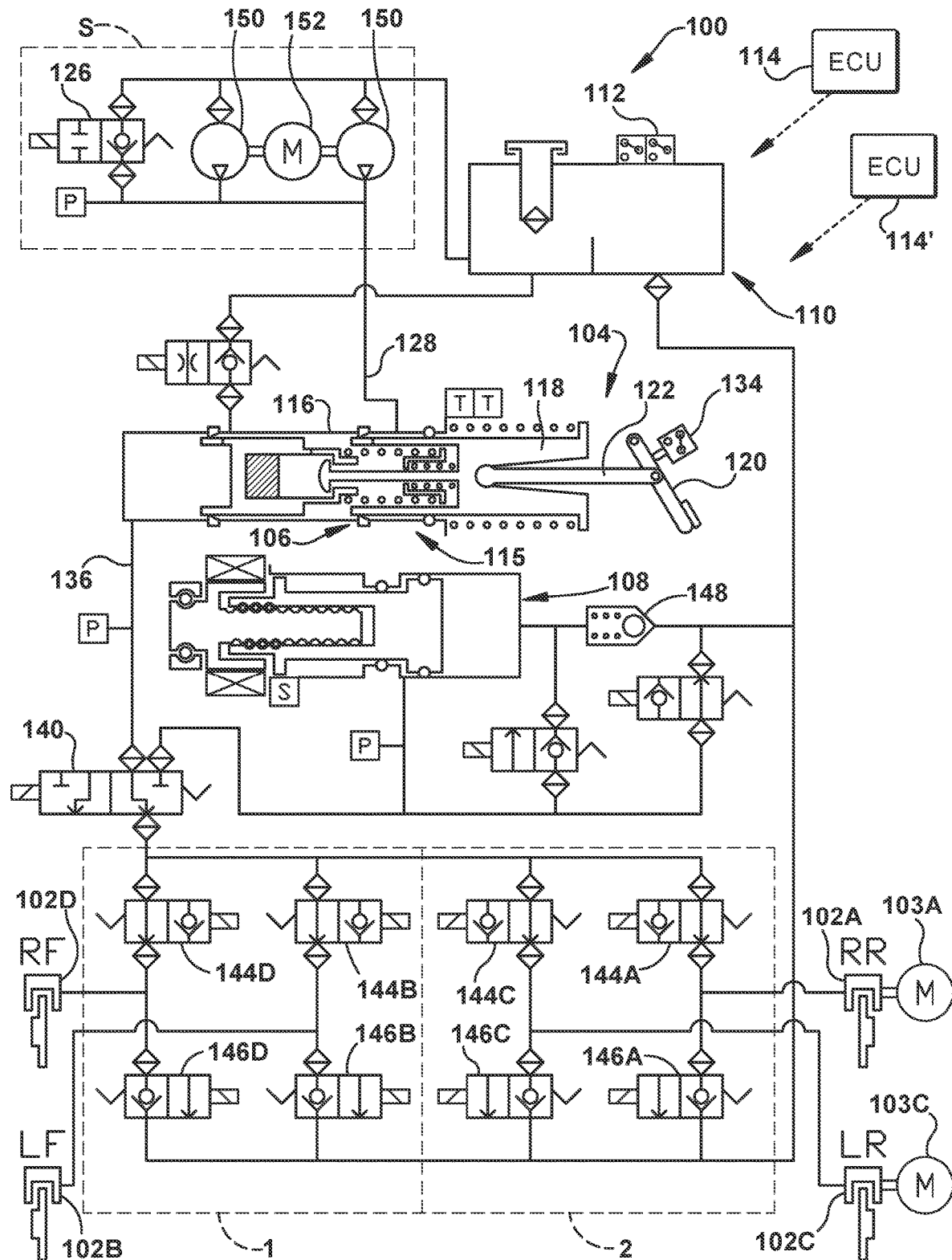
FIG. 5 is a schematic hydraulic diagram of the brake system of FIG. 1, in a fourth configuration.

FIG. 5 shows the previously described brake system 100 in a fourth configuration, including both an integrated pedal simulator 106 contained within a housing 116 of the master cylinder 115, and a second electronic control unit 114'. As symbolized by the dashed line "S", the pumps 150, pump motor 152, and simulator test valve 126 may be controlled by the second electronic control unit 114' in the configuration depicted in FIG. 3. In the brake system 100 shown in FIG. 5, all four of the wheel brakes 102 are connected to the three-way valve 144 for selective switching between the power transmission unit 108 and manual push-through from the master cylinder 115.

FIGS. 1 and 3 both depict similarly arranged first and second configurations for providing "front wheel only" manual push-through, with these brake systems 100 being provided with one and two electronic control units 114, respectively. Analogously, FIGS. 4 and 5 both depict similarly arranged third and fourth configurations for providing "all four wheels" manual push-through, with these brake systems 100 being provided with one and two electronic control units 114, respectively.

Figure 6:
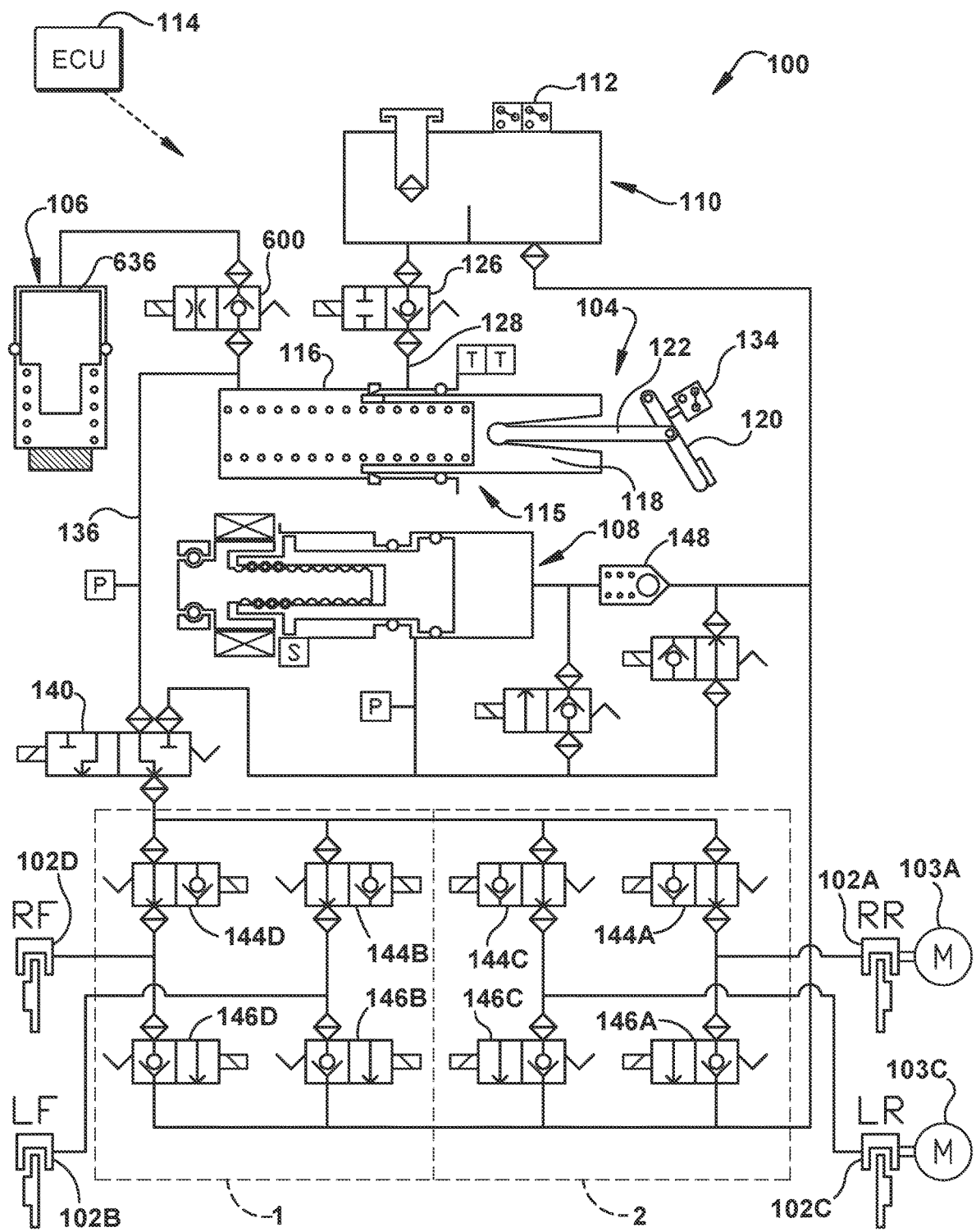
FIG. 6 is a schematic hydraulic diagram of the brake system of FIG. 1, in a fifth configuration.
Figure 7:
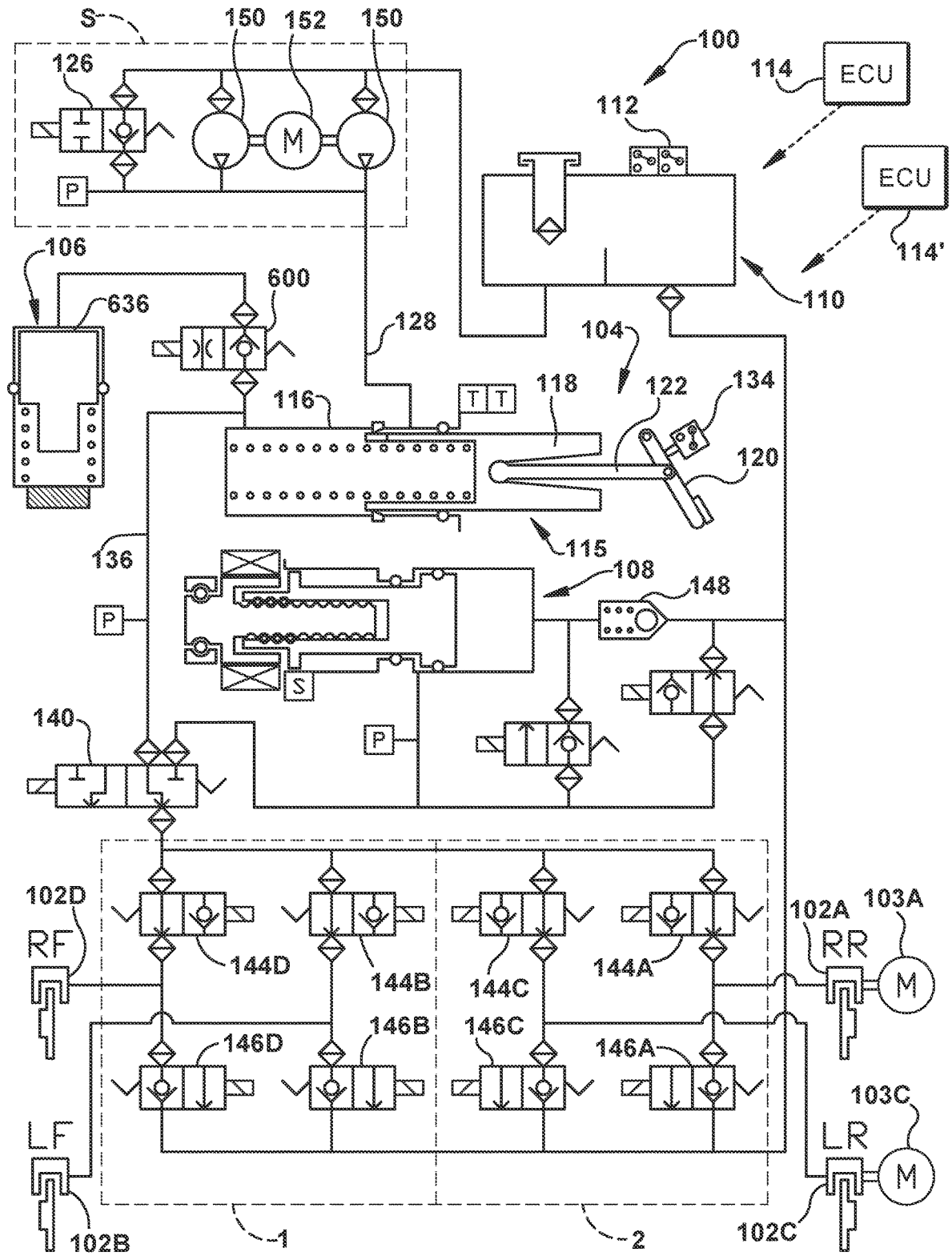
FIG. 7 is a schematic hydraulic diagram of the brake system of FIG. 1, in a sixth configuration.

Turning now to FIGS. 6-7, example fifth and sixth configurations for providing "all four wheels" manual push-through are shown, with these brake systems 100 being provided with one and two electronic control units 114, respectively. (It is contemplated that similar brake systems to those shown in FIGS. 6-7 could be provided by one of ordinary skill in the art for providing two-wheel manual push-through of either the pair of front wheel brakes 102B, 102D or the pair of rear wheel brakes 102A, 102C.)

Description of components of the brake systems 100 shown in FIGS. 6-7 that are similar to previously described brake systems 100 will not be repeated. In the fifth and sixth configurations of FIGS. 6-7, in contrast to the first through fourth configurations previously described, the pedal simulator 106 is not integrated into the master cylinder 115. Instead, the pedal simulator 106 is hydraulically separated from the master cylinder 115 by pedal simulator valve 600.

Figure 8:
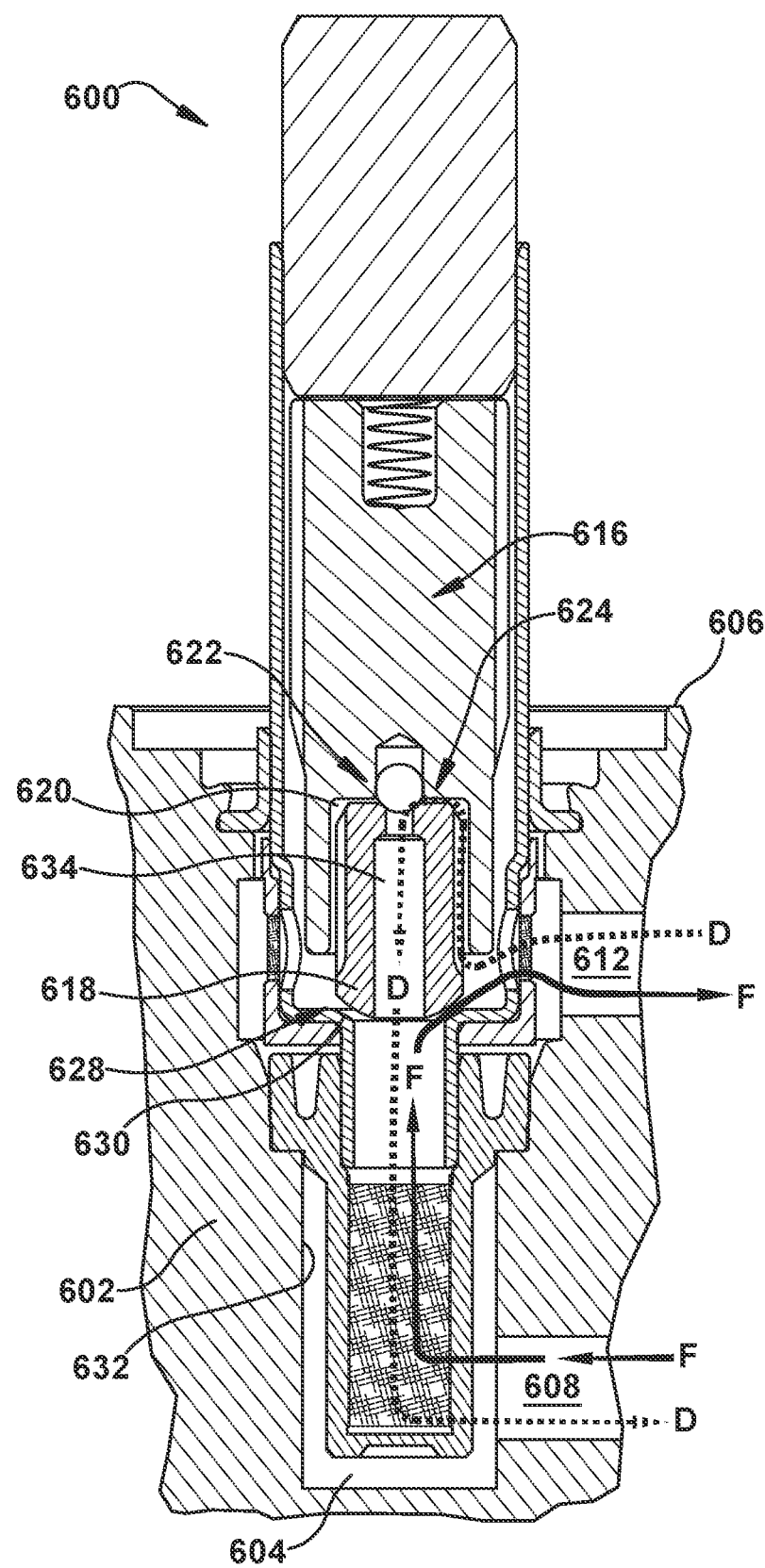
FIG. 8 is a schematic partial side view of a second component suitable for use in a brake system according to any aspect of the present invention.

FIG. 8 schematically depicts a pedal simulator valve 600 similar to that shown and described in co-pending patent application U.S. patent application Ser. No. 17/188,152, filed concurrently herewith and titled "Simulator Valve", which is incorporated herein by reference in its entirety, for all purposes.

The pedal simulator valve 600 selectively permits fluid communication between the master cylinder 115 and a separate pedal simulator 106. The simulator valve 600 includes a housing 602 having a center bore 604 extending longitudinally from a first housing surface 606. The "longitudinal" direction is substantially vertical, in the orientation of FIG. 8. The housing 602 includes a pedal simulator passage 608 extending therethrough to at least partially place the center bore 604 in fluid communication with a pedal simulator 106. The housing 602 includes a master cylinder passage 612 extending therethrough to at least partially place the center bore 604 in fluid communication with a master cylinder 115. The master cylinder passage 612 is located longitudinally between the first housing surface 606 and the pedal simulator passage 608.

An armature 616 is located at least partially within the housing 602 for selective longitudinally reciprocating motion with respect thereto between first and second armature positions (shown in the second, raised/upper, armature position in FIG. 6). A poppet 618 is located within the housing 602 and is at least partially located within an armature bore 620 of the armature for selective longitudinally reciprocating motion with respect thereto between first and second poppet positions (shown in the second, raised/upper, poppet position in FIG. 8).

The poppet 618 defines a first valve 622 cooperatively with a first valve seat 624 of at least a portion of the armature bore 620. The poppet 618 at least partially defines a second valve 628 longitudinally spaced from, and oppositely facing, the first valve seat 624. The second valve 628 includes a second valve seat 630 located within the center bore 604 and at least partially spaced apart from a bore wall 632 of the center bore 604. The poppet 618 includes a poppet bore 634 extending longitudinally therethrough and selectively occluded by the first valve 622.

The armature 616, poppet 618, and center bore 604 cooperatively define a damped flow fluid path therebetween. The damped flow fluid path selectively permits fluid communication therethrough from the master cylinder passage 612 to the pedal simulator passage 608. The damped flow fluid path permits fluid communication therethrough when the armature 616 is in the second armature position and the poppet 618 is in the first (lowered) poppet position. Though this is not the situation depicted in FIG. 8 (instead, the poppet 618 is shown raised into the second poppet position), the dashed arrows D schematically depict the approximate damped flow fluid path through the pedal simulator valve 600, if the first valve 622 were to be open.

The armature 616, poppet 618, and center bore 604 also cooperatively define a free fluid path therebetween, with the free fluid flow path shown by solid-line arrows F in FIG. 8. The free flow fluid path selectively permits fluid communication therethrough from the pedal simulator passage 608 to the master cylinder passage 612. The free flow fluid path permits fluid communication therethrough when the armature 616 is in the second armature position and the poppet 618 is in the second poppet position, as shown in FIG. 8.

In the brake system 100 shown in FIGS. 6-7, the pedal simulator test valve 126 has been moved upstream of the master cylinder 115 (the pedal simulator valve 600 shown in FIGS. 6-7 is downstream of the master cylinder 115). This arrangement may be facilitated, for example, when an anti-leak-down feature is built into the simulator test valve 126, rather than being the separate bypass valve 148 previously described.

The pedal simulator 106 is in selective fluid communication with the master cylinder 115 for providing predetermined brake pedal response. More specifically, the master cylinder 115 is in fluid communication with the pedal simulator 106 via a master cylinder passage. The input piston 118 is slidably disposed in the bore of the housing 116 of the master cylinder 115. When the brake pedal unit 104 is in its rest position (the driver is not depressing the brake pedal 120), the structures of the master cylinder 115 permit fluid communication between the bore of the housing 116 and the reservoir 110 via a reservoir conduit 128. The pedal simulator 106 is therefore in selective fluid communication with the master cylinder 115 for providing predetermined brake pedal 120 response to the driver (e.g., brake pedal "feel"). Manual push-through may be easier for the driver (require less foot pressure) in the brake systems 100 of FIGS. 6-7 than in the brake systems 100 of FIGS. 1 and 3-5 because the driver does not have to also push against the simulator spring(s) 200 when the pedal simulator 106 is separated from the master cylinder 115.

A simulation pressure chamber of the pedal simulator 106 is in fluid communication with the pedal simulator passage, which is in fluid communication with the master cylinder 115 of the brake pedal unit 104. One example of desired operation of the simulator valve 106 is during a failed and/or initial/startup condition, in which the brake pedal unit 104 is utilized to provide a source of pressurized fluid to the hydraulically operated ones of the wheel brakes 102A, 102B, 102C, and 102D in a push-through manner, as described herein.

Figure 9:
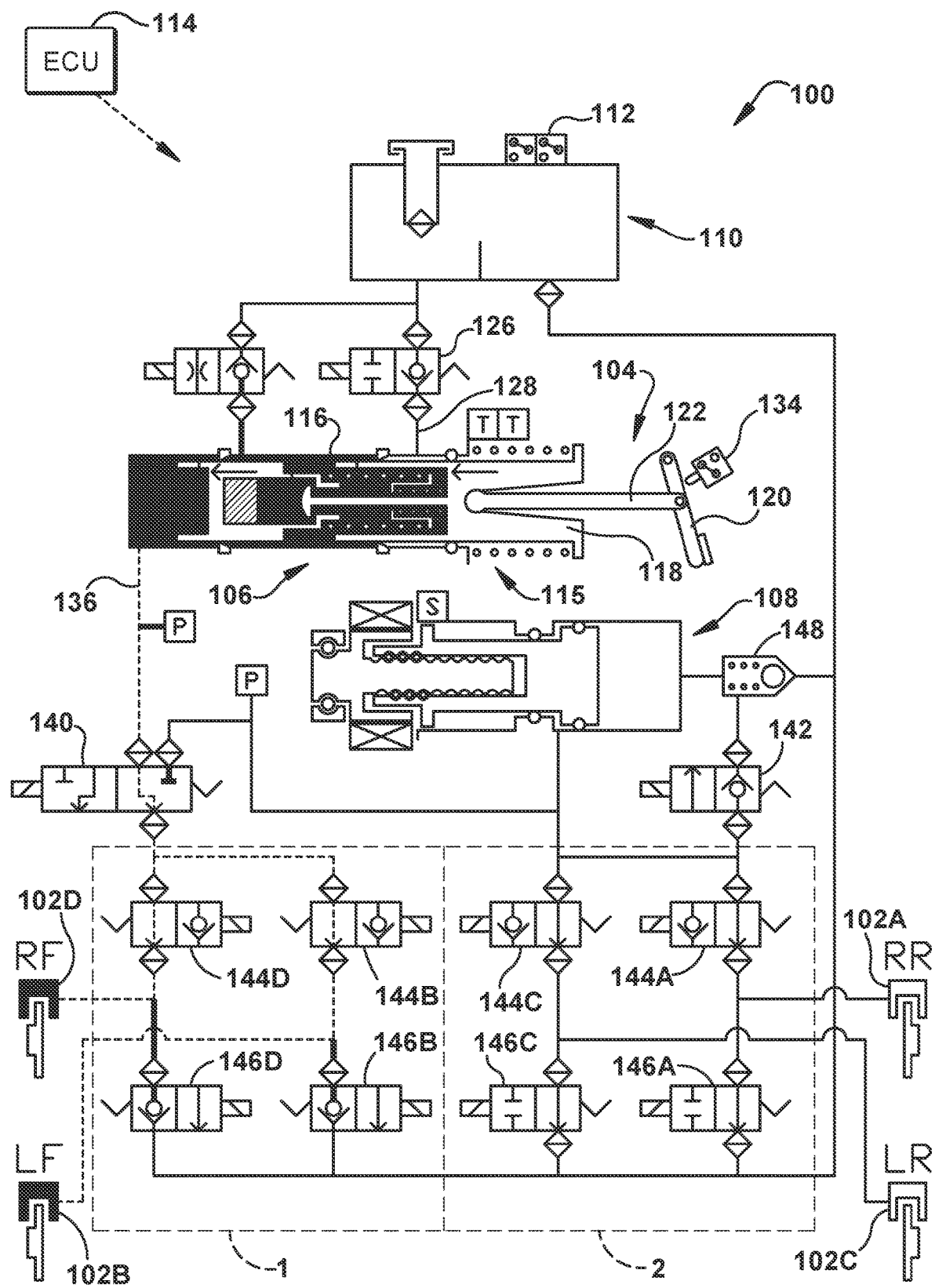
FIG. 9 is a schematic hydraulic diagram of the brake system of FIG. 1 in a first phase of operation.
Figure 10:
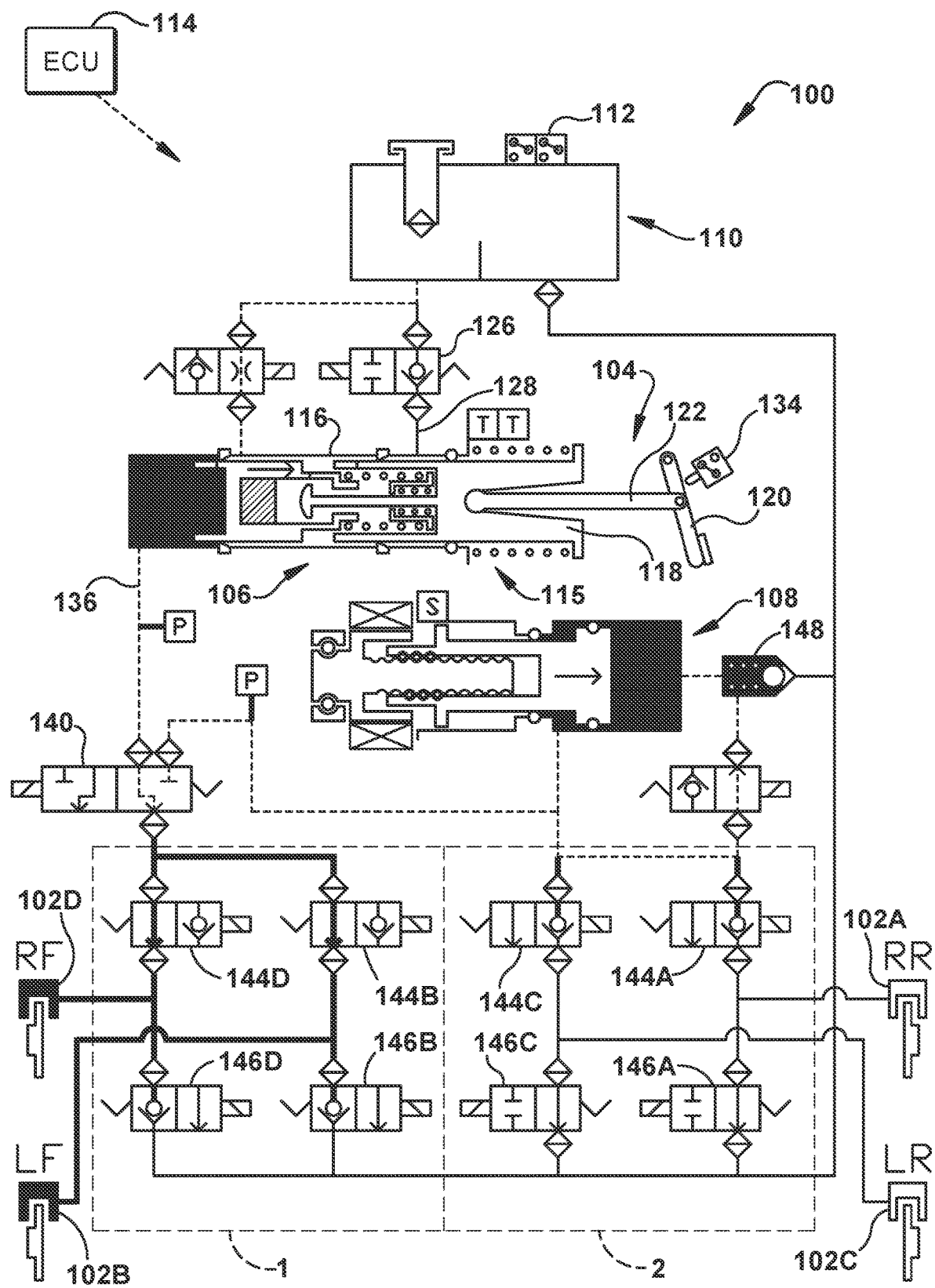
FIG. 10 is a schematic hydraulic diagram of the brake system of FIG. 1 in a second phase of operation.
Figure 11:
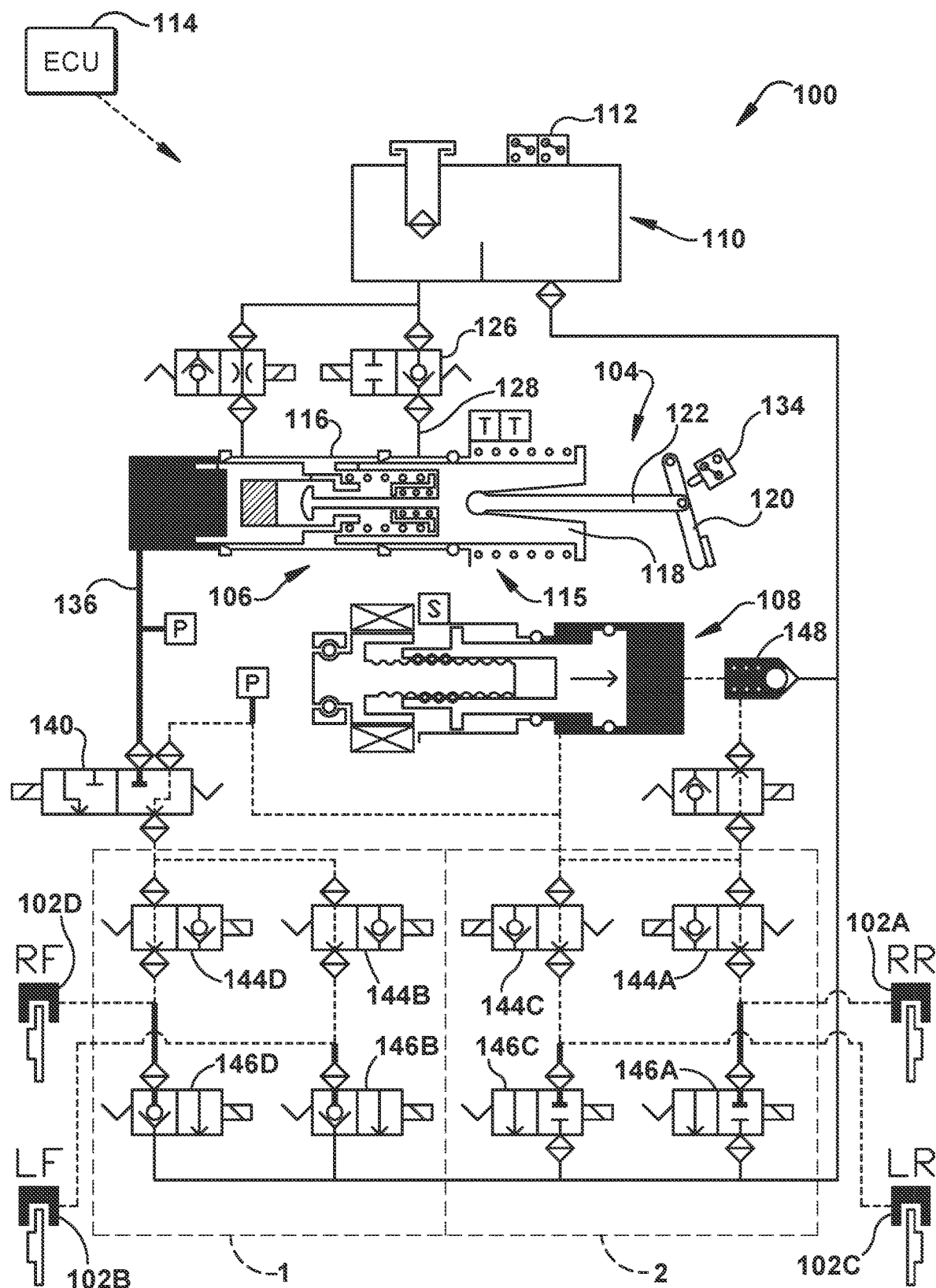
FIG. 11 is a schematic hydraulic diagram of the brake system of FIG. 1 in a third phase of operation.

With reference now to FIGS. 9-11, three respective phases of an example sequence of operation of the brake system 100 as shown, for example, in FIG. 1, are provided. Specifically, the brake systems 100 of FIGS. 9-11 are shown as having a two-wheel push-through feature (here, push-through to the pair of front wheel brakes 1028, 102D), though one of ordinary skill in the art can readily provide modifications to the depicted systems to facilitate four-wheel push-through braking, using any combination of components as shown and described elsewhere herein, for a desired use environment of the present invention.

The heavy-line or solid-shaded portions of the structures of FIGS. 9-11 are under pressure. For example, as shown in FIG. 9, the master cylinder 115 is under pressure from the driver's foot, applied via the brake pedal 120. This pressure is pushed through the master cylinder output 136 and is being passed through the three way valve 140. The electronic control unit 114 has not yet actuated the motor of the power transmission unit 108 to pressurize the power transmission unit 108. Front wheel brakes 102B and 102D are also under hydraulic pressure, as shown by the solid shading in FIG. 9.

The dashed lines in FIGS. 9-11 depict components which are subject to both pressure and fluid flow. For example, as shown in FIG. 9, hydraulic fluid is flowing from the master cylinder output 136 (under pressure, as mentioned, from the driver's foot on the brake pedal 120), through the three-way valve 140 and into the first pressure circuit (dashed line 1) to power the front wheel brakes 102B and 102D in a manual push-through manner.

Referring to FIG. 9, the integrated pedal simulator 106 is hydraulically transferring pressure and/or force within the master cylinder 115 to assist with a comfortable pedal "feel" for the driver and reduce pedal travel from that which would occur without the integrated pedal simulator. A pedal simulator valve 600 similar to that shown and described in aforementioned co-pending patent application U.S. patent application Ser. No. 17/188,152, filed concurrently herewith and titled "Simulator Valve" could be used to assist in the startup sequence shown in FIGS. 9-11.

Turning now to FIG. 10, the ignition is on and the brake system 100 is shown in a "transition" phase. Here, the power transmission unit 108 has been energized and is building up pressure (as shown by the dark shading in that component). Although hydraulic fluid has not yet traveled through to the rear, non-push-through wheel brakes 102A, 102C, the isolation valves 144A and 144C belonging to that pair of rear wheel brakes 102 A, 102C have been energized, to prevent unwanted transfer of hydraulic fluid to those rear wheel brakes 102A, 102C. As a result, the pair of rear wheel brakes 102A, 102C can be filled in a desired manner. The three-way valve 140 has permitted pressure within the first pressure circuit 1, as shown by the bold or heavy shading of the hydraulic lines leading to the pair of front wheel brakes 102B, 102D in FIG. 10.

Finally, with reference to FIG. 11, the brake system 100 has entered a "boosted" braking apply mode. The master cylinder 115 and the power transmission unit 108 are under pressure, as are all four of the wheel brakes 102 (as shown by the dark shading of all of these components in FIG. 11). As long as the driver indicates, via pressure on the brake pedal 120, that application of boosted brakes is desired, the brake system 100 will remain in the configuration shown in FIG. 11.

Figure 12:
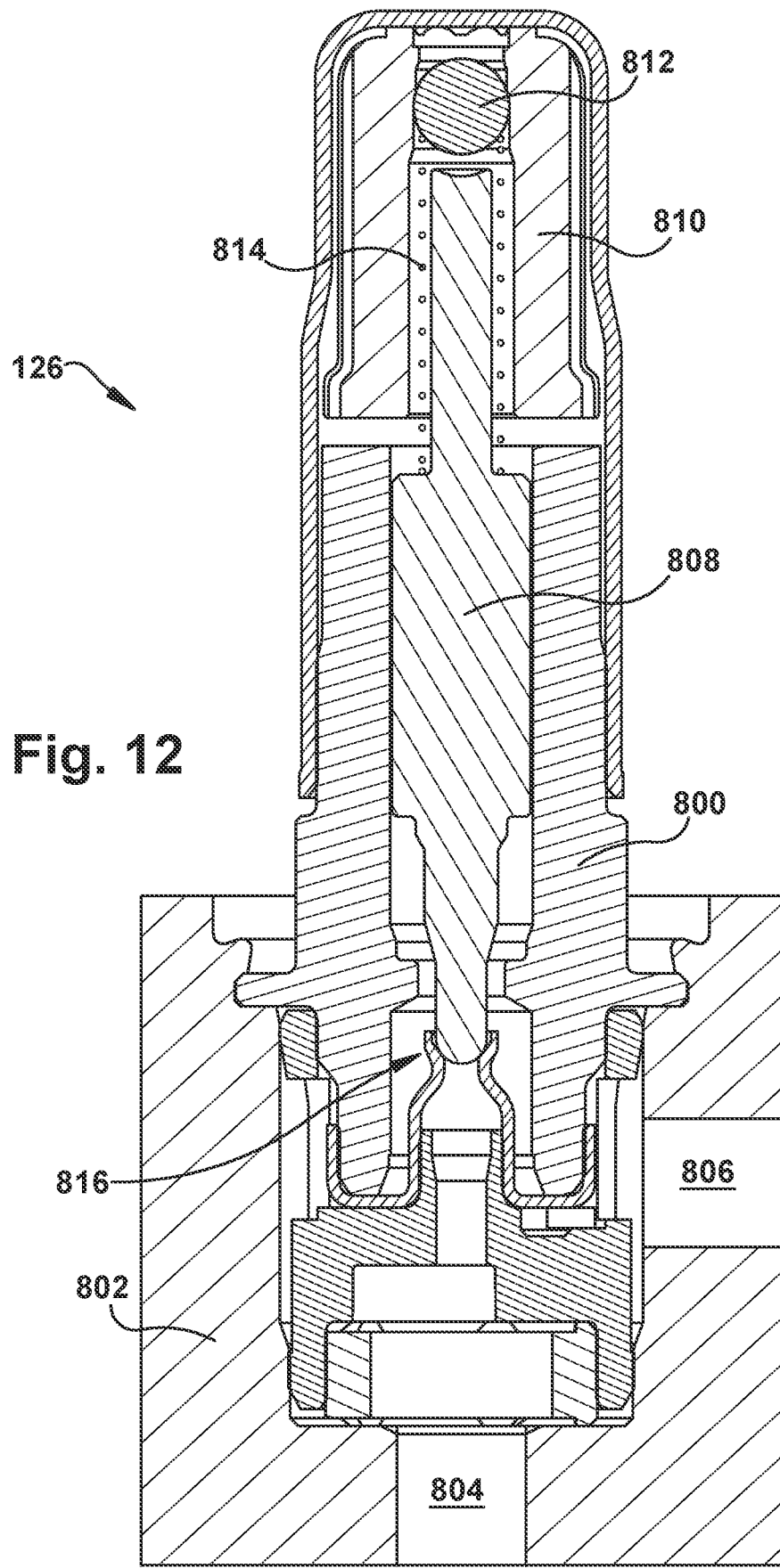
FIG. 12 is a schematic partial side view of a third component suitable for use in a brake system according to any aspect of the present invention.

FIGS. 12-13 are schematic depictions of certain components that could be used with various configurations of the brake system 100, akin to the depiction of the integrated pedal simulator 106 and master cylinder 115 in FIG. 2 and the pedal simulator valve 600 in FIG. 8 and the related descriptions.

FIG. 12 schematically depicts a simulator test valve 126 which can be used with certain embodiments of the brake system. The simulator test valve 126 shown in FIG. 12 includes a body 800, carried by a housing 802. The housing 802 includes a master cylinder passage 804 and a reservoir passage 806. A tappet 808 reciprocates longitudinally within the body 800 under solenoid-driven actuation by the armature 810. The "longitudinal" direction is substantially vertical, in the orientation of FIG. 12.

A first end of the tappet 808 is configured to selectively engage a ball 812 carried by the armature 810. A test valve spring 814 biases the tappet 808 away from the ball 812. As depicted in FIG. 12, the test valve spring 814 is longitudinally interposed between the tappet 808 and the ball 812. It is contemplated, however, that the ball 812 could instead be longitudinally interposed between the test valve spring 814 and the tappet 808. Regardless of the specific design chosen, the test valve spring 814 biases the simulator test valve 126 toward a closed condition, by pushing the tappet 808 downward, and the orientation of FIG. 12, toward engagement with a seat 816. As a result, the simulator test valve 126 shown in FIG. 12 may help to prevent unwanted leak-down of the reservoir 110, due to a malfunction or failure of the hydraulically driven ones of the wheel brakes 102A, 102B, 102C, and/or 102D, and the release of hydraulic fluid to ground as a result of that unwanted malfunction.

Turning now to FIG. 13, an example configuration of a suitable master cylinder 115 without an integrated pedal simulator 106 is shown. The master cylinder 115 of FIG. 13 includes a housing 116 defining a longitudinally extending bore 1300. The "longitudinal" direction in FIG. 13 is substantially horizontal, and the orientation of that Figure. First and second springs 1302A and 1302B extend longitudinally within the bore 1300. A spring guide 1304 is longitudinally interposed entirely between the first and second springs 1302A and 1302B. As shown, the spring guide 1304 could have a substantially "cup-like" shape, to facilitate hydraulic flow therethrough during operation of the master cylinder 115. It is contemplated that the spring guide 1304 may reciprocate longitudinally within the bore 1300 during at least a portion of the operation of the master cylinder 115 shown in FIG. 13.

When present, the spring guide 1304 resists buckling force of the first and second springs 1302A and 1302B during operation of the master cylinder 115. Stated differently, were the spring guide 1304 to be omitted and only a single spring provided to the bore 1300 (not shown), that single, relatively long spring 1302 would be subject to buckling or shifting during operation, in an undesired manner. One of ordinary skill in the art will be readily able to provide a master cylinder 115 with the spring and guide arrangement depicted in FIG. 13, along with any other desired features suitable to assist operation of the master cylinder 115.

It is contemplated that the parking brakes for the rear wheel brakes 102A and 102C—described herein as being electrically powered—could also or instead be powered hydraulically, rather than electrically. Such an arrangement of the rear wheel parking brakes could be facilitated by one of ordinary skill in the art through the provision of suitable hydraulic valves and lines, according to the teachings of the present invention.

It is contemplated that components, arrangements, or any other aspects of the brake system 100 shown and described herein could also or instead be used in the brake systems shown and depicted in co-pending patent applications U.S. patent application Ser. No. 17/188,227, filed concurrently herewith and titled "Hydraulic Brake Boost", and/or U.S. patent application Ser. No. 17/188,288, filed concurrently herewith and titled "Apparatus and Method for Control of a Hydraulic Brake System", both of which are hereby incorporated by reference in their entirety for all purposes.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A brake system for a vehicle having a pair of front wheel brakes and a pair of rear wheel brakes, the system comprising:
 a reservoir;
 a master cylinder defining a longitudinally extending bore and being operable during a manual push-through mode by actuation of a brake pedal connected to the master cylinder to generate brake actuating pressure at a first output for hydraulically actuating at least one of the pair of front wheel brakes and the pair of rear wheel brakes during the manual push-through mode;
 a power transmission unit configured for selectively providing pressurized hydraulic fluid for actuating at least a selected one of the pair of front wheel brakes and the pair of rear wheel brakes in a boosted braking mode during a braking event;
 a pair of rear brake motors for selectively electrically actuating respective left and right rear wheel parking brakes;
 an electronic control unit for controlling at least one of the power transmission unit and the pair of rear brake motors;
 a pedal simulator integrated into the master cylinder by being at least partially enclosed within a housing of the master cylinder to create an integrated pressure simulator for providing predetermined brake pedal response, the pedal simulator including first and second springs longitudinally extending within the bore and a spring guide having a portion positioned radially between the first and second springs and supporting the first and second springs so as to resist buckling force of the first and second springs during operation of the master cylinder;

a two-position three-way valve hydraulically connected with the master cylinder and the power transmission unit and with at least the selected one of the pairs of wheel brakes;

the three-way valve selectively controlling hydraulic fluid flow from a chosen one of the master cylinder and the power transmission unit to at least the selected one of the pairs of wheel brakes;

a normally-closed DAP valve located hydraulically between the power transmission unit and at least one of the three-way valve and at least the selected one of the pairs of wheel brakes; and an isolation valve and a dump valve associated with each wheel brake of the pair of front wheel brakes and the pair of rear wheel brakes, the isolation valve being located hydraulically between a respective wheel brake and the three-way valve, and the dump valve being located hydraulically between a respective wheel brake and the reservoir, for at least the selected one of the pairs of wheel brakes.

2. The brake system of claim 1, wherein the integrated pedal simulator is configured to provide a progressive force-versus-travel curve for the brake pedal using a plurality of force-response springs of the pedal simulator.

3. The brake system of claim 1, wherein the master cylinder includes an input piston having a shaft that extends into the pedal simulator such that the shaft moves in response to actuation of the brake pedal.

4. The brake system of claim 3, wherein the shaft has a rounded end that cooperates with a resilient stop in response to actuation of the brake pedal beyond a predetermined distance.

5. The brake system of claim 1, wherein the master cylinder and the pedal simulator are longitudinally aligned with one another within the housing of the master cylinder.

6. The brake system of claim 1, wherein the three-way valve is configured to selectively switch the brake system between manual push-through mode and the boosted braking mode.

7. The brake system of claim 1, wherein the isolation valves for the pair of front wheel brakes connect to the power transmission unit through the three-way valve, and the pair of rear wheel brakes bypasses the three-way valve to connect to the power transmission unit.

8. The brake system of claim 1, wherein the electronic control module is a first electronic control module, the brake system including a second electronic control module, wherein a chosen one of the first and second electronic control modules controls the power transmission unit and at least the selected one of the pairs of wheel brakes, and the other one of the first and second electronic control modules controls the rear brake motors.

9. The brake system of claim 1, including a replenishing check valve located fluidically between the reservoir and the power transmission unit for assisting with refilling of the power transmission unit under predetermined conditions.

10. The brake system of claim 1, including a simulator test valve located fluidically between the reservoir and the master cylinder, the simulator test valve including a test valve spring biasing the simulator test valve toward a closed condition.

11. The brake system of claim 3, wherein each of the first and second springs encircles the shaft of the input piston.

12. The brake system of claim 3, wherein the first spring abuts the input piston.

13. The brake system of claim 1, wherein the spring guide, the first spring, and the second spring all longitudinally overlap one another at a common position along the length of the bore.

14. A brake system for a vehicle having a pair of front wheel brakes and a pair of rear wheel brakes, the system comprising:

a reservoir;

a master cylinder operable during a manual push-through mode by actuation of a brake pedal connected to the master cylinder to generate brake actuating pressure at a first output for hydraulically actuating at least one of the pair of front wheel brakes and the pair of rear wheel brakes during the manual push-through mode;

a power transmission unit configured for selectively providing pressurized hydraulic fluid for actuating at least a selected one of the pair of front wheel brakes and the pair of rear wheel brakes in a boosted braking mode during a braking event;

a pair of rear brake motors for selectively electrically actuating respective left and right rear wheel parking brakes;

an electronic control unit for controlling at least one of the power transmission unit and the pair of rear brake motors;

a pedal simulator integrated into the master cylinder by being at least partially enclosed within a housing of the master cylinder to create an integrated pressure simulator for providing predetermined brake pedal response;

a two-position three-way valve hydraulically connected with the master cylinder and the power transmission unit and with at least the selected one of the pairs of wheel brakes;

the three-way valve selectively controlling hydraulic fluid flow from a chosen one of the master cylinder and the power transmission unit to at least the selected one of the pairs of wheel brakes;

a normally-closed DAP valve located hydraulically between the power transmission unit and at least one of the three-way valve and at least the selected one of the pairs of wheel brakes; and an isolation valve and a dump valve associated with each wheel brake of the pair of front wheel brakes and the pair of rear wheel brakes, the isolation valve being located hydraulically between a respective wheel brake and the three-way valve, and the dump valve being located hydraulically between a respective wheel brake and the reservoir, for at least the selected one of the pairs of wheel brakes, wherein the isolation valves for the pair of front wheel brakes and the pair of rear wheel brakes connects to the power transmission unit through the three-way valve.

* * * * *